United States Patent [19]

Fukui et al.

[11] Patent Number: 5,010,865

[45] Date of Patent: Apr. 30, 1991

[54] IGNITION TIMING CONTROLLER FOR AN INTERNAL COMBUSTION ENGINE

[75] Inventors: Wataru Fukui; Toshio Iwata, both of Himeji, Japan

[73] Assignee: Mitsubishi Denki Kabushiki Kaisha, Tokyo, Japan

[21] Appl. No.: 485,004

[22] Filed: Feb. 26, 1990

[30] Foreign Application Priority Data

Feb. 27, 1989 [JP] Japan ................. 1-43322
Feb. 27, 1989 [JP] Japan ................. 1-43323

[51] Int. Cl.$^5$ ............................... F02P 5/15
[52] U.S. Cl. ..................... 123/424; 123/179 BG
[58] Field of Search ............. 123/179 BG, 416, 417, 123/418, 424

[56] References Cited

U.S. PATENT DOCUMENTS

| | | | |
|---|---|---|---|
| 3,871,342 | 3/1975 | Fujinami et al. | 123/416 |
| 4,359,988 | 11/1982 | Matsubara | 123/424 |
| 4,378,770 | 4/1983 | Ikeura | 123/424 |
| 4,379,444 | 4/1983 | Weber | 123/424 |
| 4,380,983 | 4/1983 | Kobashi et al. | 123/424 |
| 4,489,691 | 12/1984 | Ono et al. | 123/424 |
| 4,592,324 | 6/1986 | Nakano et al. | 123/424 |
| 4,610,231 | 9/1986 | Nakata et al. | 123/424 |

FOREIGN PATENT DOCUMENTS 0085483 5/1984 Japan ................. 123/424

*Primary Examiner*—Willis R. Wolfe
*Attorney, Agent, or Firm*—Sughrue, Mion, Zinn, Macpeak and Seas

[57] ABSTRACT

An ignition timing controller for an internal combustion engine controls the supply of current to the primary winding of an ignition coil. When the engine has started, current is supplied to the primary winding beginning at a certain piston position. When the engine is starting, current is supplied to the primary winding beginning when a special delay time has elapsed from a prescribed first piston position. The special delay time is inversely proportional to the engine rotational speed. The period of time for which the ignition coil conducts at starting is thereby shortened, and thermal damage to the ignition coil and other portions of the ignition system is prevented.

13 Claims, 3 Drawing Sheets

UNITED STATES PATENT OFFICE
PTO – BOYERS, PA DUTY STATION

MISSING PAGE TEMPORARY NOTICE

PATENT NUMBER 5010865 FOR THE ISSUE DATE OF 4/30/1991 HAS BEEN SCANNED/LOADED, BUT CONTAINS A MISSING PAGE TEMPORARY NOTICE. UPON RECEIPT OF THE MISSING PAGE(S), THE ENTIRE DOCUMENT WILL BE RESCANNED. IF YOU HAVE ANY QUESTIONS, PLEASE CONTACT THE DATA MAINTENANCE BRANCH/OFFICE OF SYSTEMS NETWORK MANAGEMENT ON (703) 306-3116 OR BY E-MAIL AT DMB_Group@uspto.gov THIS NOTICE IS FOR THE MISSING PAGE CONTAINING:

Drawings (Co Corrects)

DATA CONVERSION OPERATION
BOYERS, PA

IGNITION TIMING CONTROLLER FOR AN INTERNAL COMBUSTION ENGINE

BACKGROUND OF THE INVENTION

This invention relates to an ignition timing controller for an internal combustion engine. More particularly, it relates to an ignition timing controller which can prevent thermal damage to the ignition system when the engine is rotating at a low speed.

The cylinders of an internal combustion engine are ignited by spark plugs which are supplied current by an ignition coil. In many conventional ignition systems, the supply of current to an ignition coil is started at a prescribed, constant first piston position for each cylinder (such as 75° BTDC) and then cut off at a prescribed second piston position which varies with the rotational speed of the engine. Normally, the second piston position occurs earlier as the engine rotational speed increases. This means that the ignition coil conducts for more degrees of crankshaft rotation at low engine speeds, such as when the engine is cranking, than at high engine speeds. Since it takes longer for the crankshaft to rotate by 1 degree at low engine speeds than at high ones, the length of time for which the ignition coil conducts may be considerably longer at low engine speeds than at high engine speeds. The electric current passing through the ignition coil and other parts of the ignition system for long periods at low engine speeds can result in their being thermally damaged.

SUMMARY OF THE INVENTION

Accordingly, it is an object of the present invention to provide an ignition timing controller for an internal combustion engine which can prevent thermal damage to the power ignition coil and other portions of the ignition system of an engine at low engine rotational speeds, and particularly when the engine is just starting.

An ignition timing controller according to the present invention senses a first and a second piston position with respect to top dead center of a cylinder of an engine and includes an ignition timing calculator in the form of a microcomputer which controls the current which is supplied to the primary winding of an ignition coil. When the microcomputer determines that the engine is operating in a normal operating mode, i.e., above a prescribed rotational speed, the supply of current to the primary winding is started at a certain piston position. When the microcomputer determines that the engine is operating in a starting mode, i.e., below a prescribed rotational speed, and that the voltage of the battery for the engine is above a predetermined value, the supply of current to the primary winding is started when a predetermined delay period has elapsed from the first piston position.

The delay period can be measured either as a length of time or as a prescribed number of degrees of crankshaft rotation.

In preferred embodiments, the delay period is inversely proportional to the rotational speed of the engine. The delay period may be limited to a predetermined maximum value so that the primary winding will always be able to attain an adequate voltage.

The calculating means may also include means for determining the voltage of a battery for the engine and delaying the start of the supply of current to the ignition coil only when the battery voltage is above a prescribed level.

The present invention also relates to a method for controlling the ignition timing of an internal combustion engine. The method comprises sensing a first and a second piston position with respect to top dead center of an engine cylinder, determining whether the engine is operating in a starting mode or in a regular operating mode, supplying current to a primary winding of an ignition coil beginning at a certain piston position when it is determined that the engine is operating in a normal mode, calculating a special delay time when it is determined that the engine is operating in a starting mode, and supplying current to the primary winding of the ignition coil beginning when the length of time since the first piston position equals the special delay time.

BRIEF DESCRIPTION OF THE DRAWINGS

FIG. 1 is a block diagram of an embodiment of an ignition timing controller according to the present invention.

FIGS. 2(a) and 2(b) are wave form diagrams of the output of the signal generator and the primary current of the ignition coil of FIG. 1.

FIGS. 3(a) and 3(b) are enlarged views of a portion of FIG. 2.

FIG. 4 is a flow chart of the operation of a first embodiment of the present invention.

DESCRIPTION OF THE PREFERRED EMBODIMENTS

Figure 5:
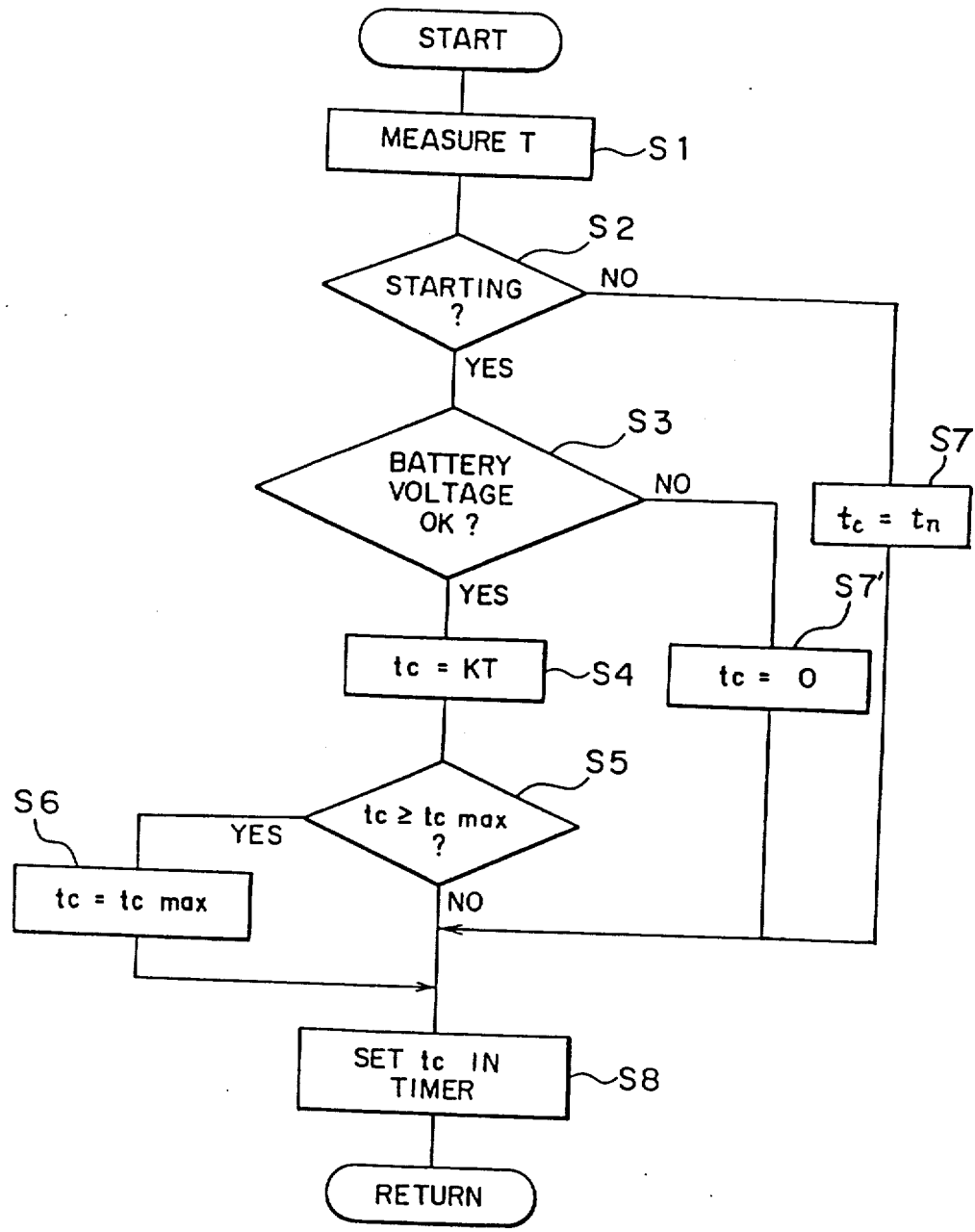
FIG. 5 is a flow chart of the operation of a second embodiment of the present invention.

A number of preferred embodiments of an ignition timing controller according to the present invention will now be described while referring to the accompanying drawings. FIG. 1 is a block diagram of a first embodiment of the present invention as applied to an unillustrated multi-cylinder engine. In the present embodiment, the engine is equipped with six cylinders, but the present invention is not limited to use with an engine having a particular number of cylinders. As shown in FIG. 1, a conventional rotational signal generator 1 and various sensors 2 provide electric input signals to an ignition timing calculator in the form of a microcomputer 4 via an interface 3. The rotational signal generator 1 is responsive to the rotations of some portion of the unillustrated engine, such as the crankshaft or the camshaft. It generates, in synchrony with the engine rotations, an output signal which indicates first and second positions with respect to top dead center of the piston of each cylinder of the engine. FIG. 2a illustrates an example of the output signal of the signal generator 1. It has a rising edge at a first piston position, such as 75° BTDC, and a falling edge at a second piston position, such as 5° BTDC, but the exact piston positions at which the signal changes between a high and low level are not important, and a different type of signal can be employed. Rotational signal generators 1 which can generate signals of this type are well-known to those skilled in the art.

The sensors 2 measure various parameters of engine opertion and include a battery voltage sensor which generates an output signal indicative of the voltage of the battery for the engine. Other sensors which are conventionally employed in ignition control systems can also be included.

Based on the input signals from the rotational signal generator 1 and the sensors 2, the microcomputer 4 calculates the ignition timing and provides power transistors 5 with ignition signals. The power transistors 5 are connected to the primary winding of an ignition coil 6, while the secondary winding of the ignition coil 6 is connected to a spark plug 7. When the power transistors 5 receive a high output voltage from the microcomputer 4, they begin to conduct and current flows through the primary winding of the ignition coil 6. When the output voltage from the microcomputer 4 falls to a low level, the current in the primary winding is cut off, a high voltage is generated in the secondary winding, and this voltage discharges through the spark plug 7 to ignite a cylinder of the engine.

FIG. 2b shows the primary winding current of the ignition coil 6 during the operation of the present embodiment. When the engine is operating in a normal operating mode, i.e., above a prescribed rotational speed, the microcomputer 4 controls the power transistors 5 so that the primary winding of the ignition coil 6 begins conducting from a certain piston position which is delayed by a normal delay time tn from the rising edge of the output signal of the signal generator 1, as shown by the dot-and-dashed lines in FIG. 2b. The normal delay time tn is generally determined in such a manner that a minimum voltage sufficient to generate a spark on the spark plug 7 can be developed at the secondary primary winding of the ignition coil 6 when the primary winding current is cut off. For example, the normal delay time tn is appropriately determined based on various engine operating parameters such as the battery voltage, the engine rotational speed, the engine load, etc. Here, it is to be noted that the way of determining the normal delay time tn is not important in the present invention but is well known in the art. On the other hand, when the engine is operating in a starting mode, i.e., just starting, the microcomputer 4 delays turning on the power transistors by a special delay time $t_c$ from the rising edge of the output signal of the signal generator 1, and the resulting primary winding current is as shown by the solid lines in FIG. 2b.

The microcomputer 4 cuts off the primary current of the ignition coil 6 at a prescribed ignition timing, which is normally determined by the engine rotational speed. In FIG. 2, ignition is shown taking place at 5° BTDC. However, this is merely an example, and methods for of controlling the ignition timing so as to occur at a desired piston position are well known to those skilled in the art.

FIGS. 3a and 3b are enlarged views of portions of FIGS. 2a and 2b, respectively. In FIG. 3, T is the length of time between a falling edge and a rising edge of the output signal of the signal generator 1. In a six-cylinder engine, if the rising and falling edges occur at 75° BTDC and 5° BTDC, respectively, then T corresponds to 50° of crankshaft rotation. Accordingly, by measuring T, the microcomputer 1 can determine the engine rotational speed. If T is less than a prescribed value, the microcomputer 4 determines that the engine is operating in a normal operating mode, and therefore, it turns on the power transistors 5 after the normal delay time tn has elapsed from each rising edge in the output of the signal generator 1. However, if T is greater than the prescribed value, the microcomputer 4 determines that the engine is running in a starting mode. At this time, if the battery voltage is above a prescribed level, the microcomputer 4 calculates a special delay time $t_c$ and delays turning on the power transistors 5 until the special delay time $t_c$ has elapsed as measured from the rising edge of the output signal of the signal generator 1. The microcomputer 4 calculates the special delay time $t_c$ by the formula $t_c = kT$, wherein k is a predetermined coefficient. As a result, the primary winding current of the ignition coil 6 is as shown by the solid line in FIG. 3b. It can be seen that the special delay time $t_c$ is inversely proportional to the engine rotational speed.

FIG. 4 is a flow chart of an example of a routine performed by the microcomputer 4 for controlling the time at which the ignition coil 6 begins conducting. In Step S1, the microcomputer 4 measures the length of period T in FIG. 3. In Step S2, the microcomputer 4 determines whether the engine is operating in a starting mode by comparing T with a prescribed value. If T is greater than the prescribed value, then it is determined that the engine is just starting, so the routine proceeds to Step S3. In Step S3, the microcomputer 4 determines from the input signals from the sensors 2 whether the battery voltage is above a prescribed value. If the battery voltage is sufficiently high, then in Step S4, the microcomputer calculates the special delay time $t_c$ by the formula $t_c = kT$. In Step S8, the special delay time $t_c$ is set in a timer within the microcomputer 4. Upon the occurrence of a rising edge of the output signal of the signal generator 1, the timer begins timing, and when the special delay time $t_c$ has elapsed, the microcomputer 4 outputs a high level signal to the power transistors 5 to turn them on and begin supplying current to the primary winding of the ignition coil 6.

In Step S2, if T is less than the prescribed value, then it is determined that the engine is operating in a normal operating mode, and the routine proceeds to Step S7, in which the special delay time $t_c$ is set to tn. Here, tn is the normal delay time as referred to above. Furthermore, in Step S3, if it is determined that the battery voltage is below the prescribed voltage, then the routine proceeds to Step S7' and the special delay time $t_c$ is set to 0. This is because even through the engine is running in a starting mode, it would not be possible to obtain an adequate ignition voltage if the conducting time of the ignition coil 6 were shortened. The routine then proceeds to Step S8, and the delay time $t_c$ is set in the timer.

Thus, in accordance with the above-described embodiment, when the engine is starting and the battery voltage is sufficiently high, the conducting time of the ignition coil 6 is shortened, and thermal damage to the power transistors 5 and the ignition coil 6 caused by excessive power consumption when the engine is just starting can be prevented.

While the above-described embodiment can prevent thermal damage to the ignition system, it is possible for the routine illustrated in FIG. 4 to shorten the conducting time of the ignition coil 6 excessively, and it may not be possible to obtain an adequate ignition voltage. This problem is solved in a second embodiment of the present invention in which an upper limit is set on the special delay time $t_c$. The structure of this embodiment is similar to that of the embodiment of FIG. 1, and it differs with respect to the routine which is performed by the microcomputer 4 to control the ignition timing. FIG. 5 is a flow chart of this routine. Steps S1–S4 and Steps S7–S8 of this routine are identical to the corresponding steps in the routine of FIG. 4. In Step S5, the special delay time $t_c$ which was calculated in Step S4 is compared with a predetermined upper limit $t_{cmax}$. If the special delay time $t_c$ is less than $t_{cmax}$, then an adequate ignition voltage can be obtained. Therefore, if in Step S5 $t_c < t_{cmax}$, then in Step S8, the special delay time $t_c$ is set in the timer as is. However, if $t_c \geq t_{cmax}$, the special delay time $t_c$ is too great to obtain an adequate ignition voltage, and so in Step S6, $t_c$ is set equal to $t_{cmax}$ and then set in the timer in Step S8. Thus, the special delay time $t_c$ which is set in the timer is never greater than $t_{cmax}$, and an adequate ignition voltage is guaranteed.

In the above-described embodiments, the delay period is a length of time, and the microcomputer 4 employs a timer to determine when the delay period has elapsed. However, it is instead possible for the microcomputer 4 to calculate the delay period as a prescribed number of degrees of crankshaft rotation and to determine when the delay period has elapsed by measuring the number of degrees of crankshaft rotation.

Although in the foregoing description, it is determined that the engine is running in a starting mode if T is greater than the prescribed value, the microcomputer 4 may also make such determination by virtue of a cranking signal which is generated by a cranking sensor or the like when the engine is cranking.

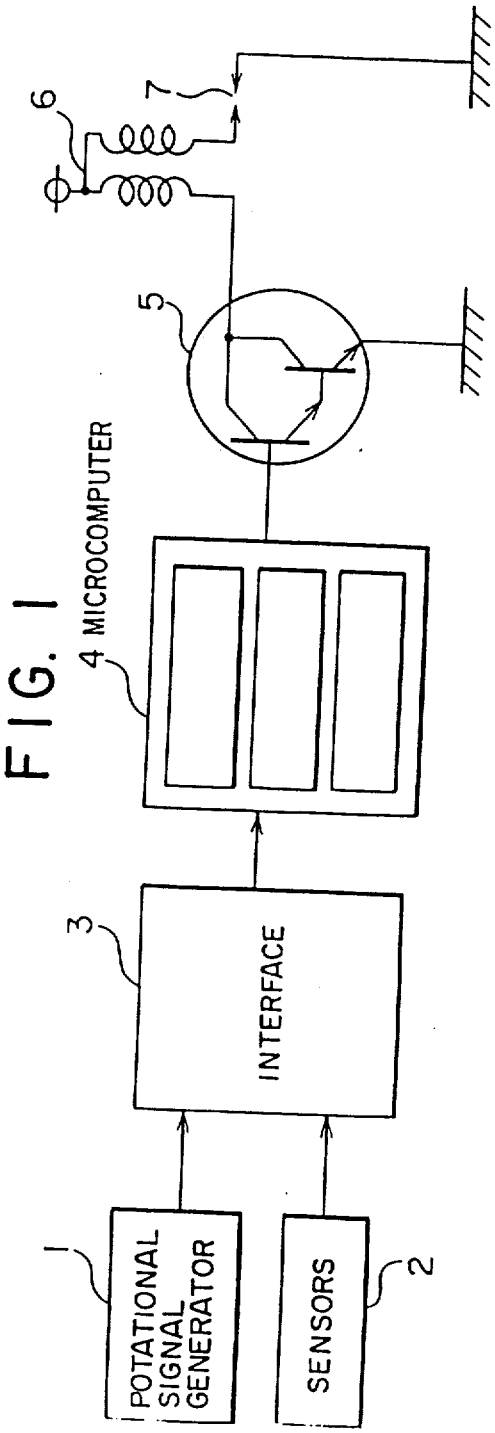

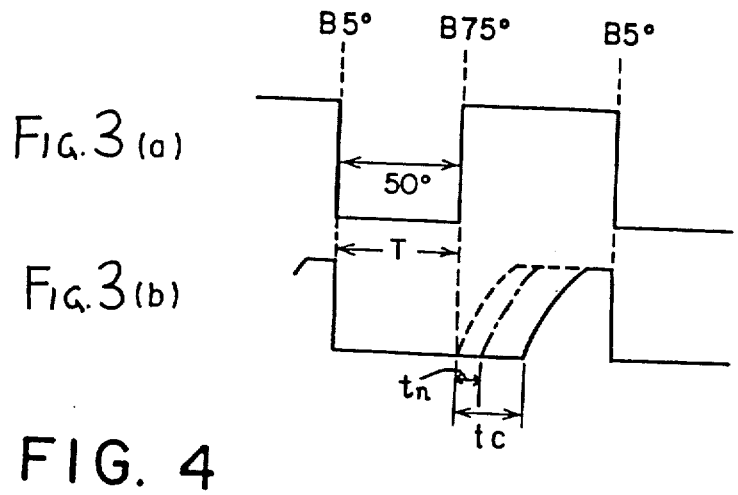
Fig.3(a)
Fig.3(b)
FIG. 4
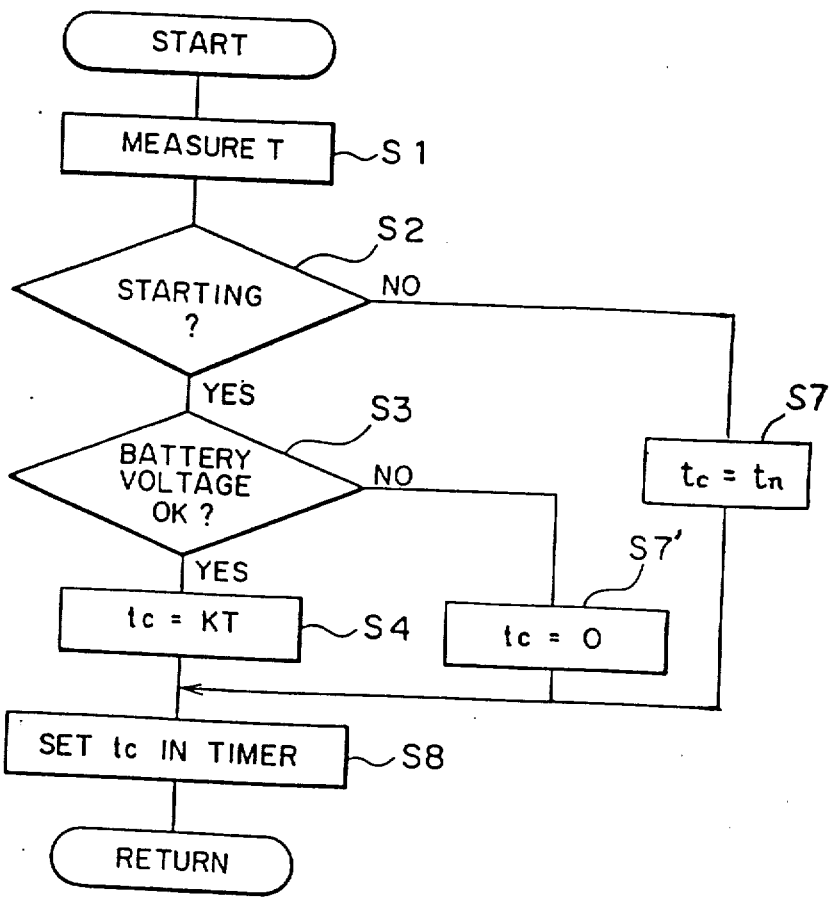

What is claimed is:

1. An ignition timing controller for a multi-cylinder internal combustion engine comprising:
 a rotational signal generator which generates a signal in synchrony with the engine rotations which indicates a prescribed first piston position with respect to top dead center of the piston of each cylinder of the engine; and
 an ignition timing calculator including means for determining whether the engine is operating in a starting mode or a normal operating mode, generating a signal to initiate current conduction through an ignition coil at a certain piston position when the engine is operating in the normal operating mode, calculating a delay period when the engine is operating in the starting mode, and generating a signal to initiate current conduction through the ignition coil only after the delay period has elapsed, as measured from the first piston position, when the engine is operating in the starting mode to thereby reduce the duration of current flow through the ignition coil and attendantly prevent thermal damage.

2. An ignition timing controller as claimed in claim 1, wherein the delay period is a length of time, and the calculator includes a timer for timing the delay period.

3. An ignition timing controller as claimed in claim 1, wherein the delay period is an angle of crankshaft rotation of the engine.

4. An ignition timing controller as claimed in claim 1, wherein the delay period is inversely proportional to the engine rotational speed.

5. An ignition timing controller as claimed in claim 4, wherein the calculator includes means for measuring the length of time T between two prescribed positions of each piston of the engine, and the delay period equals kT, wherein k is a constant.

6. An ignition timing controller as claimed in claim 1, wherein the calculator includes means for limiting the calculated delay period to a predetermined upper limit.

7. An ignition timing controller as claimed in claim 1, further comprising means for determining the voltage of a battery for the engine, wherein the calculator includes means for generating a signal to make the ignition coil begin conducting simultaneous with the first piston position when the battery voltage is below a prescribed level.

8. An ignition timing controller for a multi-cylinder internal combustion engine comprising:
 a rotational signal generator which generates a signal in synchrony with the engine rotations which indicates first and second prescribed piston positions with respect to top dead center of the piston of each cylinder of the engine; and
 a voltage sensor for sensing the voltage of a battery for the engine;
 an ignition timing calculator including means for determining whether the engine is operating in a starting mode or a normal operating mode based on the length of time between the first and second piston positions, generating a signal to make an ignition coil begin conducting at a certain piston position when the engine is operating in the normal operating mode, calculating a delay period which is proportional to the engine rotational speed when the engine is operating in the starting mode, and generating a signal to make the ignition coil begin conducting when the delay period has elapsed as measured from the first piston position when the engine is operating in the starting mode and the battery voltage as indicated by the voltage sensor is above a prescribed level.

9. A method for controlling the ignition timing of an internal combustion engine equipped with an ignition coil comprising:
 sensing a first and a second piston position with respect to top dead center;
 determining whether the engine is operating in a starting mode or a normal operating mode;
 initiating the supply of current to a primary winding of an ignition coil at a certain piston position with respect to top dead center when it is determined that the engine is operating in a normal operating mode;
 calculating a delay period when it is determined that the engine is operating in a starting mode; and
 initiating the supply of current to the primary winding of the ignition coil only after the delay period has elapsed, as measured from the first piston position, when the engine is operating in a starting mode to thereby reduce the duration of current flow through the ignition coil and attendantly prevent thermal damage.

10. A method as claimed in claim 9, further comprising determining the voltage of a battery for the engine and supplying current to the primary winding of the ignition coil at the first piston position when the battery voltage is below a prescribed level.

11. A method as claimed in claim 9, wherein the delay period is inversely proportional to the engine rotational speed.

12. A method as claimed in claim 9, further comprising limiting the delay period to a predetermined maximum value.

13. A method for controlling the ignition timing of an internal combustion engine equipped with an ignition coil comprising:
 measuring the period of time T between a first piston position and a second piston position with respect to top dead center of a cylinder of the engine;
 determining whether the engine is operating in a starting mode or a normal operating mode based on the period T;

measuring the voltage of a battery for the engine;

supplying current to a primary winding of the ignition coil beginning at a certain piston position when it is determined that the engine is operating in a normal operating mode;

calculating a special delay time which is inversely proportional to the engine rotational speed when it is determined that the engine is operating in a starting mode;

limiting the special delay time to a prescribed maximum value;

supplying current to the primary winding of the ignition coil beginning when the special delay time has elapsed as measured from the first piston position when it is determined that the engine is operating in a starting mode and the battery voltage is above a prescribed level; and supplying current to the primary winding of the ignition coil beginning at the first piston position when it is determined that the engine is operating in starting mode and the battery voltage is below the prescribed level.

* * * * *

UNITED STATES PATENT AND TRADEMARK OFFICE
CERTIFICATE OF CORRECTION

PATENT NO.  : 5,010,865
DATED       : April 30, 1991
INVENTOR(S) : Wataru FUKUI and Toshio IWATA Page 1 of 4

It is certified that error appears in the above-identified patent and that said Letters Patent is hereby corrected as shown below:

Figures 1-5 should be added as shown on the attached sheets.

Signed and Sealed this

Sixteenth Day of March, 1993

Attest:

STEPHEN G. KUNIN

*Attesting Officer*

*Acting Commissioner of Patents and Trademarks*